(12) United States Patent
Birka et al.

(10) Patent No.: US 10,479,009 B2
(45) Date of Patent: Nov. 19, 2019

(54) CO-INJECTION OF MOLDED PARTS FOR WEIGHT REDUCTION

(71) Applicant: MAGNA INTERNATIONAL INC., Aurora, CA (US)

(72) Inventors: Mark P. Birka, Northville, MA (US); Keith G. Korte, Damiansville, IL (US); Daniel R. Dobbs, Centralia, IL (US); Jeremy K. Dew, Highland, IL (US); Charles T. Parker, Nashville, IL (US)

(73) Assignee: Magna Exteriors Inc., Concord (CA)

( * ) Notice: Subject to any disclaimer, the term of this patent is extended or adjusted under 35 U.S.C. 154(b) by 0 days.

(21) Appl. No.: 15/031,981

(22) PCT Filed: Oct. 24, 2014

(86) PCT No.: PCT/US2014/062148
§ 371 (c)(1),
(2) Date: Apr. 25, 2016

(87) PCT Pub. No.: WO2015/061667
PCT Pub. Date: Apr. 30, 2015

(65) Prior Publication Data
US 2016/0288387 A1 Oct. 6, 2016

Related U.S. Application Data

(60) Provisional application No. 61/895,652, filed on Oct. 25, 2013.

(51) Int. Cl.
*B29C 45/16* (2006.01)
*B32B 27/06* (2006.01)
(Continued)

(52) U.S. Cl.
CPC ...... *B29C 45/1642* (2013.01); *B29C 44/0461* (2013.01); *B29C 45/1704* (2013.01);
(Continued)

(58) Field of Classification Search
CPC . B29C 45/1645; B29K 2105/04; B32B 27/32; B32B 5/20; B32B 27/065; B32B 2266/025
See application file for complete search history.

(56) References Cited

U.S. PATENT DOCUMENTS

| 3,751,534 A | 8/1973 | Oxley |
| 4,255,367 A | 3/1981 | Wallace et al. |

(Continued)

FOREIGN PATENT DOCUMENTS

EP  2 149 443 A1  2/2010

OTHER PUBLICATIONS

International Search Report for International Application No. PCT/US2014/062148, dated Jan. 28, 2015.

*Primary Examiner* — Hai Vo
(74) *Attorney, Agent, or Firm* — Warn Partners, P.C.

(57) ABSTRACT

A molded vehicle component (10) having a skin (14) and a lower density core (16) formed by a co-injection molding process. In a first phase, a first material for forming the skin of class A surface material is injected into a mold to partially fill the mold cavity (104). Thereafter, in a second phase, a second material is injected into the same cavity (104) to complete filling of the mold cavity (104). The second material can flow only to portions of the part where the first material is still molten and displaces the molten core of the first phase, pushing it away from co-injection gates until the mold cavity is full. The second material is pre-treated with a chemical blowing agent in order to reduce part weight by foaming the core material. The finished co-injection molded part (10) has one material on all visible class A surfaces (14) and a core (16) that is a different, less dense material.

14 Claims, 4 Drawing Sheets

(51) Int. Cl.
  *B32B 5/20*   (2006.01)
  *B32B 27/32*  (2006.01)
  *B29C 45/17*  (2006.01)
  *B29C 44/04*  (2006.01)
  *B29C 71/00*  (2006.01)
  *B29L 31/30*  (2006.01)
  *B29K 105/04* (2006.01)
  *B29C 45/18*  (2006.01)

(52) U.S. Cl.
  CPC ............... *B29C 71/00* (2013.01); *B32B 5/20* (2013.01); *B32B 27/065* (2013.01); *B32B 27/32* (2013.01); *B29C 45/1645* (2013.01); *B29C 2045/1825* (2013.01); *B29K 2105/04* (2013.01); *B29L 2031/3005* (2013.01); *B29L 2031/3044* (2013.01); *B32B 2266/025* (2013.01)

(56) References Cited

U.S. PATENT DOCUMENTS

| | | | |
|---|---|---|---|
| 4,837,251 A | 6/1989 | Okey et al. | |
| 2003/0211311 A1 | 11/2003 | Porter et al. | |
| 2006/0082173 A1* | 4/2006 | Cowelchuk | B60R 13/02 296/1.08 |
| 2006/0097536 A1* | 5/2006 | DePue | B60R 7/04 296/37.8 |
| 2006/0097545 A1* | 5/2006 | Cowelchuk | B29C 44/086 296/146.7 |
| 2008/0281010 A1* | 11/2008 | Lefas | C08J 9/0028 521/97 |

* cited by examiner

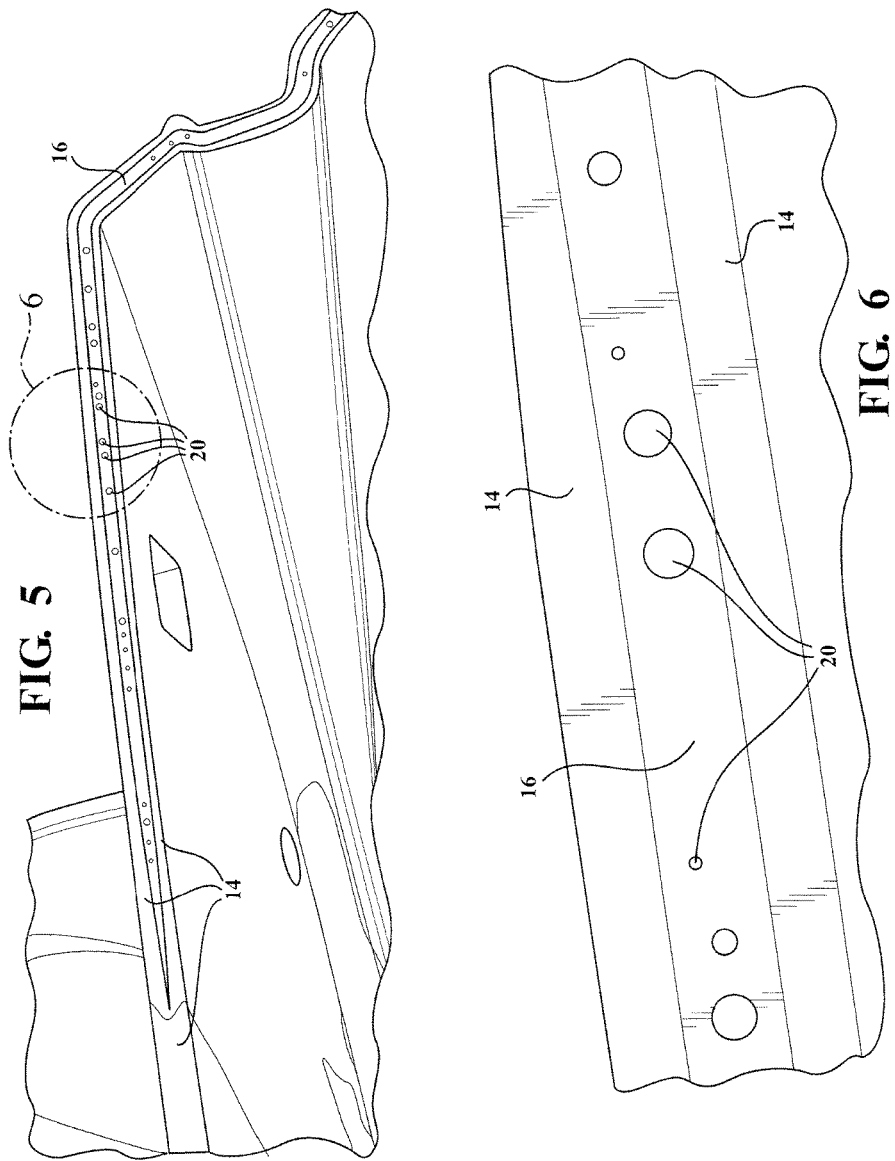

CO-INJECTION OF MOLDED PARTS FOR WEIGHT REDUCTION

CROSS-REFERENCE TO RELATED APPLICATIONS

This application is a National Stage of International Application No. PCT/US2014/062148, filed Oct. 24, 2014, which claims priority to U.S. Provisional Patent Application No. 61/895,652 filed Oct. 25, 2013. The disclosures of the above applications are incorporated herein by reference.

FIELD OF THE INVENTION

The present invention relates to thermoplastic vehicle components and method of manufacture.

BACKGROUND OF THE INVENTION

One of the current trends in the automobile industry is to lower vehicle weight to help achieve better fuel economy, thus helping to meet fuel economy standards and to offset the higher fuel prices. There are also government regulations with the stated directive of improving fuel economy by meeting more stringent demands such as imposed by Corporate Average Fuel Economy (CAFE) regulations.

Vehicles typically include fairly heavy components, including fascias making the bumper of the vehicle a target area for weight reduction. Fascias are traditionally made from a thermoplastic material using a traditional single injection molding process. Using lower density substrate materials in the traditional injection molding process is an alternative in a known attempt to reduce part weight. Using blowing agents in a single injection process is another known alternative. Using single injection molding with lower density material or blowing agents presents several manufacturing concerns related to the material, performance, and process. It is also known to reduce wallstock/part thickness. Thermoplastic composite materials used in fascia applications may also have difficulty meeting customer performance specifications.

Another concern with the manufacture of fascias is that typical coinjected fascias have one material in the coinjected part that is significantly stiffer than the other material, but this will not necessarily reduce weight and retain desired surface appearance, properties and characteristics. There are also read through areas which must be dealt with by design modifications or expensive processes. If a part is molded with too little thermoplastic skin material and with too much thermoplastic core material the core material "breaks out" of the skin material. The breakout results in visible core material at the part surface.

Accordingly, there exists a need for a molded vehicle component which is lightweight and retains desirable surface appearance, properties and characteristics, while being cost effective relative to conventional molded components and methods of manufacturing same.

SUMMARY OF THE INVENTION

In accordance with the present invention, a thermoplastic vehicle component such as a fascia construction is provided by using a co-injected injection molding process. In a first phase, a first material for forming a skin of class A surface material is injected into a mold to partially fill the mold cavity. Thereafter, in a second phase, a second material is injected into the same cavity to form the core and complete filling of the mold cavity. The second material can flow only to portions of the part where the first material is still molten and displaces the molten core of the first phase, pushing it away from co-injection gates until the mold cavity is full. The second (core) material is treated with a chemical blowing agent in order to reduce part weight by foaming the core material. The finished co-injection molded part has one material on all visible class A surfaces and a core that is a different, less dense material.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 5 is a cross-sectional view through the molded vehicle component of FIG. 1 showing a skin, core material, and chemical blowing agent induced foaming, in accordance with the present invention;

FIG. 6 is an enlarged view of FIG. 5 showing section "6";

DETAILED DESCRIPTION OF THE PREFERRED EMBODIMENTS

The following description of the preferred embodiment(s) is merely exemplary in nature and is in no way intended to limit the invention, its application, or uses.

Referring generally to FIGS. 1-8, there is provided a molded vehicle component, that is a thermoplastic part such as a fascia, generally shown at 10. The molded vehicle component 10 includes a substrate, generally shown at 12, having an outer Class A show surface layer or skin, generally shown at 14 and a core, shown generally at 16, encapsulated in the skin 14. A first material including a paintable or otherwise Class A surface moldable "virgin" material is injected into a mold cavity of a molding assembly and immediately thereafter a second material is injected for forming the core 16 that is treated with a chemical blowing agent in order to reduce part weight by "foaming" the core material. There is depicted a fascia to illustrate an exemplary final product produced and process. However, the features and process described herein are suitable to allow application to any other vehicle parts/components and assemblies where reduced weight without compromising appearance is desired. Such applications include, but are not limited to, front/rear fascias, door panels, exterior/interior decorative trim and panels, floor consoles, and instrument panels.

The first material forms the skin 14 and is a thermoplastic polyolefin (TPO) material that is paintable or molded in color. The second material forms the core 16 and is a TPO material that is infused with gas to decrease density of the core 16 for reducing the weight of the paintable TPO injection molded component 10 a predetermined amount. A predetermined amount of gas is directly introduced to the core material using a desirable predetermined chemical blowing agent (CBA).

The CBA is a pelletized material additive that is mixable with the base substrate material, TPO, at a predetermined low percentage by weight. An operable CBA mixing device is provided with a heating barrel and the selected CBA is operable to activate by the heat in the barrel at a predetermined temperature. When activated, the CBA forms a gas, preferably, carbon dioxide ($CO_2$), which "foams" the plastic melt. The gas further expands in the mold cavity until the CBA is fully activated. The gas creates small voids in the substrate material, which provide for lower part weight. Therefore, when the second material is heated and injected for forming the core 16 the infused CBA forms carbon dioxide gas that creates small voids in the second material which reduces density of the core 16 and, therefore, reduces part weight.

Figure 8:
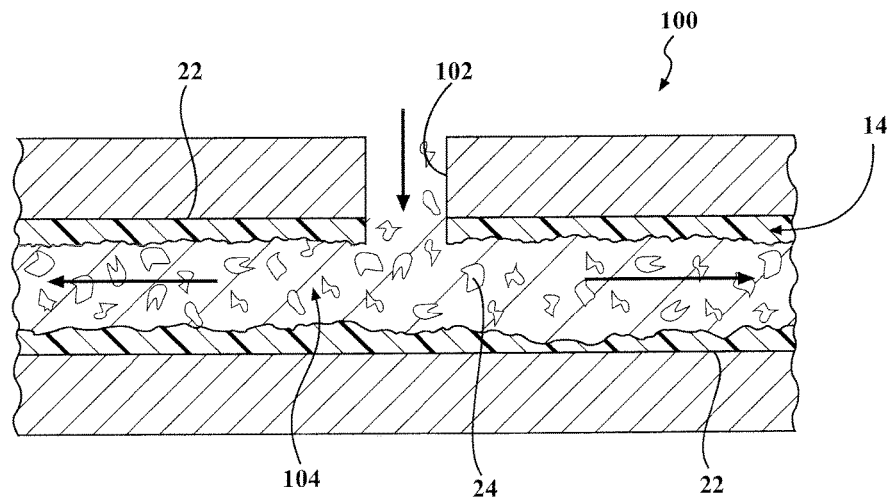
FIG. 8 is a sectional view of an exemplary molding system of the present invention providing the molded vehicle component with a skin and with a gas infused core structure.

Referring generally to FIGS. 1-8, and more particularly to FIG. 8, there is provided an exemplary molding assembly, shown generally at 100, including a valve gate 102 provided operable for initially injecting the first material, e.g., virgin show surface quality thermoplastic material, into the mold cavity, shown generally at 104, followed by the injection of the second material, e.g., CBA induced foamed thermoplastic core material, for forming the molded vehicle component 10 that is a thermoplastic part such as a fascia. The virgin TPO provides an outer surface coating 22 on the mold cavity 104 and at least one show surface on the final part 10.

Prior to injecting materials into the mold cavity 104, the desired CBA is selected and provided as a pelletized material additive that is then mixed with the second material at a predetermined low percentage by weight using the mixing device and heated to a predetermined temperature. The co-injection molding process further includes a first phase where the first material, "skin" substrate material, is injected through at least one valve gate 102 into the mold 100 to partially fill the mold cavity 104. Immediately thereafter, in a second phase or shot the second material, inner core material, is injected into the same cavity 104 to complete filling of the mold cavity 104. When the second material is heated and injected for forming the core 16 the infused CBA forms carbon dioxide gas that creates small voids 24 in the second material which reduces density of the core 16 and, therefore, reduces part weight. Most preferably, a plurality of valve gates are provided and are operably located in the mold 100 for injecting the first material and/or second material through respective valve gates into the mold cavity 102 to meet the desired appearance, weight reduction and structural requirements.

The first shot of material cools quickly where the first material contacts the mold cavity 104 steel. Therefore, a skin of the first material forms, leaving only the core molten. When the second material is injected it can flow only to the portions of the part where the first material is still molten. The second shot displaces the molten core of the first shot, pushing the first material away from the co-injection gate(s) 102 until the mold cavity is full. In accordance with this process, it is made possible to mold a part that has a first material on all visible surfaces and that has a core that is a different, second material. Having treated the core material with CBA results in reduces part weight by "foaming" the core material.

The formed skin 14 has a predetermined thickness that varies between predetermined locations throughout the molded vehicle component 10 depending upon the particular application requirements, e.g., structural mounting features, installed visibility. The wallstock of the molded component is from about 3 to 5 mm thick, preferably, from about 3 to 4 mm thick, most preferably, about 3 mm thick. The skin thickness varies and is generally about 0.2 to 3.5 mm where there is no core material in the fascia, most preferably, about 0.3 to 3.0 mm.

The formed core 16 provides the internal structure having predetermined thickness(es) and density suitable for reducing part weight while retaining desirable surface appearance, properties and characteristics, depending upon the particular application, via coinjection with reduced density core material and desired skin material. Conventionally, one material in the coinjected part is significantly stiffer than the other material. With the coinjected part and process in accordance with the present invention, since the core material is infused with a gas to create voids in the core substrate, this results in decreased density of the core material so that the core material is less dense than the skin material, which provides for reduced overall part weight. The unique benefit of introducing gas into only the core 16 is that the gas treated material is isolated from the part surface 22 by the untreated skin 14, which retains its normal appearance, properties and characteristics.

Figure 1:
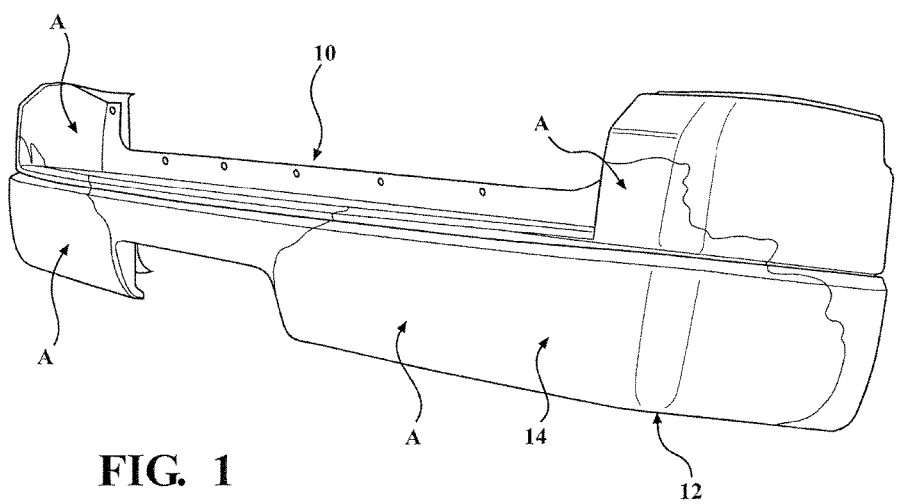
FIG. 1 is a perspective view showing a molded vehicle component in the form of a fascia for a motor vehicle, in accordance with the present invention.
Figure 2:
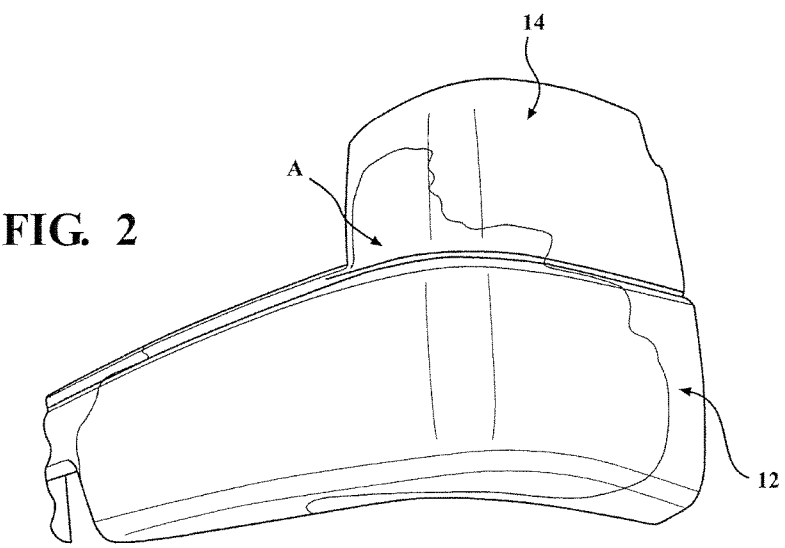
FIG. 2 is an enlarged perspective view showing a section of the molded vehicle component of FIG. 1, in accordance with the present invention.

Referring generally to FIGS. 1-8, and more particularly to FIGS. 1-6, there is depicted the molded vehicle component 10, e.g., exemplary fascia construction, with the core material reading through to the show surface for demonstrational purposes only. Thus, there is depicted TPO core material 16 seen through predetermined areas of the skin 14 (of natural TPO), which areas are shown generally at "A". However, in production, the virgin TPO material forming the skin 14 includes typical colorants and/or additives used for forming the show surface. This material is preferably a paintable thermoplastic polyolefin. Preferably, the skin 14 and core TPO materials are complimentary and/or identical in color. By way of non-limiting example, in production, a dark grey or black skin material is used substantially identical to the core material color. FIG. 2 is an enlarged sectional view of FIG. 1 showing the TPO core 16 encapsulated in the TPO skin 14. Thus, the present invention provides a molded part that has the first material on all visible surfaces and that has the core material that is a different, second material located at predetermined certain areas and depth(s) in the molded assembly.

The skin 14 (or surface substrate, Class A surface) is paintable and not CBA treated. Utilizing CBA in only the co-injected core 16 of the part 10 is most preferred. By only introducing CBA into the core material, the surface substrate to which the paint is applied is not CBA treated, which CBA is known to cause appearance issues. Such appearance issues are a significant issue on single inject parts treated with CBA. CBA treating only the core material is a significant improvement and also allows utilization of lower cost materials in the core, such as low cost virgin materials and regrind materials.

Figure 3:
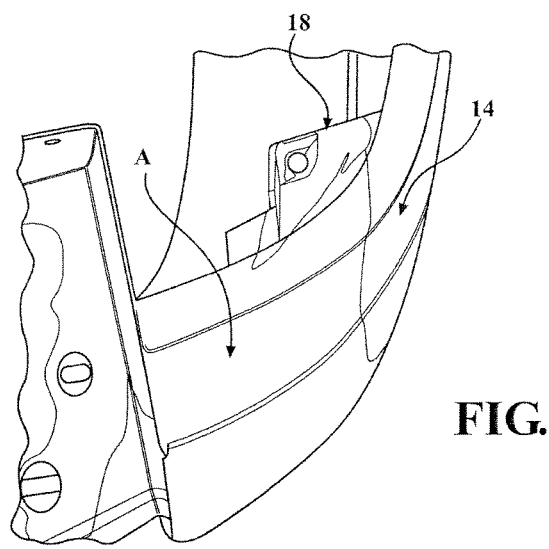
FIG. 3 is a view depicting a core material breakout to a skin surface condition on a molded vehicle component in the form of a fascia.
Figure 4:
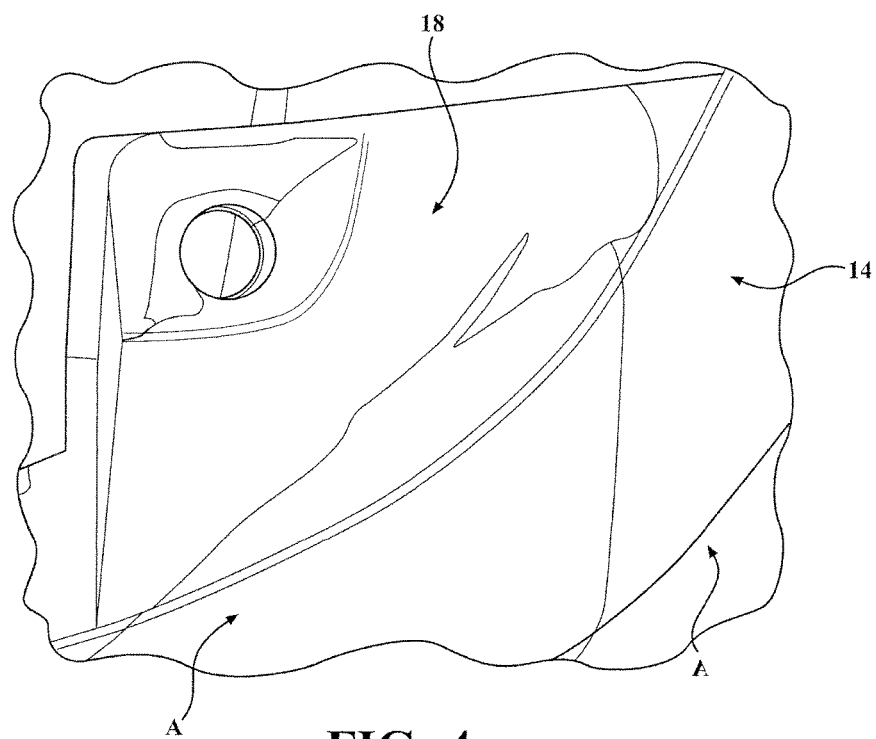
FIG. 4 is an enlarged view of the portion of FIG. 3 depicting the core material breakout to the skin surface condition.
Figure 7:
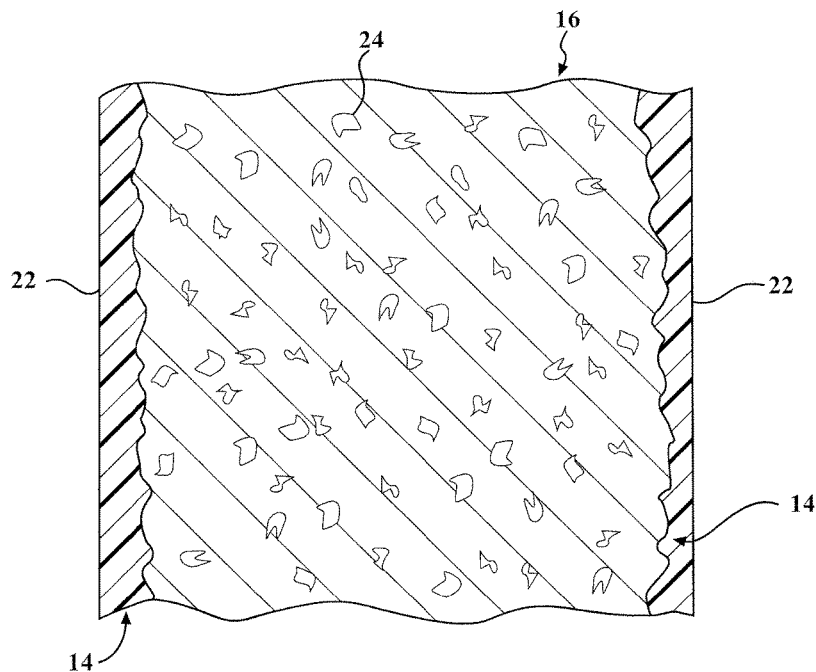
FIG. 7 is an exemplary cross-sectional view of the molded vehicle component for a motor vehicle illustrating the distribution of the gas infused core of the present invention.

A predetermined amount of TPO skin 14 is used operable to encapsulate the TPO core 16 and reduce or eliminate core material breakout through the skin material, in accordance with the present invention. Material breakout is a problem because it is viewable creating an undesirable appearance to the Class A surface. FIGS. 3-4 illustrate a molded vehicle component that was co-injected with too little of the first material for the skin 14 and with too much of the second material for the core 16 such that the core material broke out of the skin material in an edge area, shown generally at 18. The breakout 18 results in visible core material at the part surface. Thus, in the area of any breakout 18 the core material breaks out of the skin material, rather than the core 16 remaining encapsulated within the skin 14 as is desired. Advantageous encapsulation of the core 16 within the skin 14 is illustrated at areas "A" (e.g., see FIGS. 1-2 and 7).

It is understood that the surface area "A" where the core 16 material can be seen through the skin in the figures is not limiting and is for demonstration purposes only. Any alternative predetermined amount and configuration of core material and skin material suitable for providing good surface appearance and other predetermined properties and characteristics while reducing part weight can be used.

FIGS. 5-6 illustrate a sectional view of the molded vehicle component 10 having the TPO skin 14, and the TPO core 16 with CBA induced foaming 20 that generates small voids or cavities. The small voids 20 are generally spherical and/or oval and of various sizes and dispersed randomly, and alternatively, voids, such as those voids 24 depicted in FIGS. 7-8 or generally obround, spherical, oval, kidney-shaped and/or other suitable irregular cross-sections of various sizes and dispersed randomly throughout the core material.

In the present invention, a CBA and process for foaming the core 16 is most preferred. However, other foaming processes and materials, such as a microcellular foam process are contemplated for utilization in the molding assembly of the present invention (such as a MuCell™ process licensed from Trexel™, Inc. of Wilmington, Mass.). An inert gas blending device can be provided and an inert gas selected for use as an alternative to CBA.

Generally, the part weight reduction in accordance with the present invention is at least 1%. Typically, the part weight reduction in accordance with the present invention is at least 5.0% relative to a baseline co-injection part without CBA and/or relative to a single injection molded part. Preferably, the part weight reduction in accordance with the present invention is at least 1.0% and/or at least 0.06 pounds (lbs), most preferably, at least 5.65% weight savings and/or at least 0.36 lbs weight savings. By way of non-limiting example, first testing results have shown that by co-injection with CBA core only, e.g., ACBA20LP™, at 1.00%, the part weight savings is at least 0.06 lbs and at least 1.01% when compared to an exemplary co-injection baseline without CBA. By way of non-limiting example, second testing results have also shown that co-injection with CBA core only, e.g., ACBA20LP™, at 3.00%, the part weight savings is increased even further to at least 0.36 lbs and at least 5.65% weight savings when compared to the same exemplary co-injection without CBA. The exemplary baseline comprised mold and paint of fascia in a coinjection process using production TPO skin and production TPO core. The first testing comprised coinjection with CBA at 1.00% in core TPO (virgin skin). The second testing comprised coinjection with CBA at 3.00% in core TPO (virgin skin). Most notably, the second testing of 3.0% CBA core provided a significant combination of benefits, including, weight reduction, appearance, shrink, impact resistance, and paint adhesion over known assemblies and processes and over single injection CBA in TPO substrate, in particular as to appearance. The present invention also helps to reduce or eliminate rippled/dimpled surface appearance after paint.

Further, it has been found that due to poor appearance, single injection with CBA is not suitable for painted applications and show part applications, whereas coinjection with a CBA treated core in accordance with the present invention results in significant weight savings, good part performance, impact resistance, and paint adhesion, manageable shrink, good appearance, and reduction or elimination of visible core material edge boundary read-through. These are also significantly beneficial over single injection with CBA, which has poor appearance and is not suitable for painted applications. Cycle time and cost effectiveness is also improved with the present invention.

The design features and process described herein is implemented on any other thermoplastic part substrate application suitable for reducing part weight while retaining desirable surface appearance, properties and characteristics using coinjection molding with reduced density core material and desired skin material.

The description of the invention is merely exemplary in nature and, thus, variations that do not depart from the essence of the invention are intended to be within the scope of the invention. Such variations are not to be regarded as a departure from the spirit and scope of the invention.

What is claimed is:

1. A thermoplastic component for a motor vehicle, comprising:
    an outer surface layer of a co-injection moldable first material having a class A forming surface and no blowing agent and that is paintable material, wherein said first material is a thermoplastic olefin,
    a core of co-injection moldable second material induced with at least about 3 wt % of chemical blowing agent for decreasing density of the core material, wherein the core is less dense than the outer surface layer, wherein said second material is a thermoplastic olefin,
    wherein weight of the thermoplastic component is reduced by at least about 5 percent,
    wherein the core is fully encapsulated by the outer surface layer;
    wherein the thermoplastic component comprises a wallstock defined as a combination of the core and the outer surface layer, and the wall stock is from about 3 to 4 millimeters thick,
    wherein thickness of the outer surface layer varies at predetermined locations of the thermoplastic component, and
    wherein when the thermoplastic component is devoid of the core the thickness of the outer surface layer is about 0.3 to 3.0 millimeters.

2. The thermoplastic component for a motor vehicle of claim 1, wherein the chemical blowing agent forms gas that creates voids in the second material.

3. The thermoplastic component for a motor vehicle of claim 2, wherein the chemical blowing agent is directly introduced into the second material of the core and forms carbon dioxide gas which foams the second material.

4. The thermoplastic component for a motor vehicle of claim 3, wherein the carbon dioxide gas treated second material is isolated from the class A surface by the untreated outer surface layer, which retains desired appearance, properties and characteristics.

5. The thermoplastic component for a motor vehicle of claim 1, wherein the chemical blowing agent is a predetermined pelletized material additive that is mixable with the second material, said chemical blowing agent being activated at a predetermined heated temperature such that when activated the chemical blowing agent allows carbon dioxide to be generated which foams the second material.

6. The thermoplastic component for a motor vehicle of claim 1, wherein the core is spaced a predetermined distance from the Class A surface of the outer surface layer at a plurality of predetermined areas to operably allow thermoplastic component weight reduction while not breaking out through the outer surface layer so as to allow a desired appearance to the class A surface.

7. The thermoplastic component for a motor vehicle of claim 1, wherein the thermoplastic component is selected from the group consisting of front/rear fascias, door panels, exterior/interior decorative trim and panels, floor consoles, and instrument panels.

8. A thermoplastic component forming a fascia for a motor vehicle, comprising:
   an outer surface layer of a first material that is a thermoplastic polyolefin co-injection moldable and that is paintable material having a class A forming surface and no chemical blowing agents,
   a core of thermoplastic polyolefin co-injection moldable second material directly induced with at least about 3 wt % of chemical blowing agent that forms gas that creates voids in the second material which reduces density of the core and reduces weight of the thermoplastic component by at least about 5 percent, wherein the gas treated second material is isolated from the class A surface by the outer surface layer which is not treated with chemical blowing agents,
   wherein the core is fully encapsulated by the outer surface layer,
   wherein the thermoplastic component comprises a wallstock defined as a combination of the core and the outer surface layer, and the wall stock is from about 3 to 4 millimeters thick,
   wherein thickness of said outer surface layer varies at predetermined locations of the thermoplastic component, and
   wherein when the thermoplastic component is devoid of the core the thickness of the outer surface layer is about 0.3 to 3.0 millimeters.

9. A method for molding a thermoplastic component for a motor vehicle, comprising:
   providing a first material that is an injection moldable, paintable thermoplastic polyolefin material and is not treated with chemical blowing agents;
   providing a second material that is an injection moldable thermoplastic polyolefin material;
   providing a mold having co-injection gates and a mold cavity capable of receiving an injection of the first material for forming an outer surface layer having at least one class A surface and of immediately thereafter receiving an injection of the second material to complete filling of the mold cavity for forming a core;
   treating the second material directly with a chemical blowing agent in an amount of at least about 3.0 percent by weight of the core;
   heating the second material to a predetermined temperature to activate the chemical blowing agent to create gas that creates voids in the second material which decreases the density of the core material, wherein the core is less dense than the outer surface layer;
   injecting the first material into predetermined areas of the mold cavity, wherein the first material cools where contact is made with the mold cavity and remains molten where not in contact with the mold cavity;
   injecting the treated second material into predetermined areas of the mold cavity, wherein the gas further expands in the mold cavity until the chemical blowing agent is fully activated, and wherein the second material displaces the molten first material until the mold cavity is filled;
   wherein weight reduction of the thermoplastic component is at least about 5%,
   wherein the core is fully encapsulated by the outer surface layer,
   wherein the thermoplastic component comprises a wallstock defined as a combination of the core and the outer surface layer, and the wall stock is from about 3 to 4 millimeters thick,
   wherein thickness of the outer surface layer varies at predetermined locations of the thermoplastic component, and
   wherein when the thermoplastic component is devoid of the core the thickness of the outer surface layer is about 0.3 to 3.0 millimeters.

10. The method for molding a thermoplastic component of claim 9, further comprising providing a chemical blowing agent mixing device having a heating barrel for activating the chemical blowing agent to form carbon dioxide which foams the second material.

11. The method for molding a thermoplastic component of claim 9, wherein the gas treated second material is isolated from the class A surface by the untreated outer surface layer, which retains desired appearance, properties and characteristics.

12. The method for molding a thermoplastic component of claim 9, wherein a sequential valve gate mold is used for the process.

13. The method for molding a thermoplastic component of claim 9, further comprising painting the class A surface.

14. The method for molding a thermoplastic component of claim 9, wherein the chemical blowing agent is a predetermined pelletized material additive that is mixable with the second material, said chemical blowing agent being activated at a predetermined heated temperature such that when activated the chemical blowing agent allows carbon dioxide to be generated which foams the second material.

* * * * *